United States Patent [19]
Flournoy et al.

[11] 3,744,298
[45] July 10, 1973

[54] PIPELINE LEAK DETECTOR AND METHOD
[75] Inventors: Norman E. Flournoy; Ralph H. Clinard, Jr., both of Richmond, Va.
[73] Assignee: Texaco Inc., New York, N.Y.
[22] Filed: Sept. 24, 1971
[21] Appl. No.: 183,500

[52] U.S. Cl. .............................................. 73/40.5 A
[51] Int. Cl. ............................................ G01m 3/24
[58] Field of Search .................... 73/49.5 R, 49.5 A; 346/139, 33 P

[56] References Cited
UNITED STATES PATENTS
3,117,453   1/1964   Ver Nooy ........................ 73/40.5 R
3,471,652  10/1969   Moore et al. ....................... 346/136

Primary Examiner—Donald O. Woodiel
Attorney—Thomas H. Whaley et al.

[57] ABSTRACT

Pipeline leak detection method employs a record strip that advances at low speed unless acoustic energy from a leak is detected. When it is detected the record advance is greatly speeded up in order to adequately identify and record the leak-generated energy.

Pipeline leak detection apparatus is mounted on an internal pipeline vehicle. It includes a record strip with means to increase the speed of traversing the strip as acoustic energy from a leak is detected. Additionally, there may be an improved odometer associated with the vehicle to make highly accurate distance measurement for locating the vehicle when a leak is detected.

11 Claims, 8 Drawing Figures

PIPELINE LEAK DETECTOR AND METHOD

CROSS REFERENCE TO RELATED APPLICATION

This invention includes subject matter that is common with a co-pending application, Ser. No. 183,449 filed Sept. 24, 1971 by N.E. Flournoy.

BACKGROUND OF THE INVENTION

1. Field of the Invention

This invention concerns pipeline leak detection in general. More specifically, it relates to an improved method and apparatus for detecting leaks in pipelines. It is particularly applicable to long pipeline sections where high-pressure fluid (especially liquid) is being transmitted.

2. Description of the Prior Art

There have been numerous proposals for detecting leaks in pipelines, and many of them have employed principles of acoustic-energy or sonic-type detection. This is because of the well-known fact that leaks produce sonic energy, although the reasons for such acoustic energy generation are not too well understood.

One major failing in the prior attempts to locate pipeline leaks has been the ability to accurately measure the location of an instrument at all times as it is carried through the pipeline. Consequently, it is an object of this invention to provide a combination that includes extremely accurate distance measurement so that the location of a leak when detected by a pipeline "pig" may be determined with sufficient accuracy to make it feasible to uncover the pipeline where the leak is located, after the pig has been recovered.

Also, while prior arrangements have been suggested for recording sonic energy as it is detected by a pipeline instrument moving through the line, one serious drawback has related to the distances that are involved so that a very lengthy record strip was required. This made such former arrangements quite impracticable. In this invention, on the other hand, there is a provision for changing the record speed from zero, or a low speed, to a high speed whenever the acoustic energy level has exceeded a predetermined minimum. In such manner, the amount of record strip needed is greatly reduced, and the recording of a pipeline survey is made practicable.

SUMMARY OF THE INVENTION

Briefly, the invention concerns a method applicable to pipeline leak detection which provides for accurately determining the location of a leak. The method comprises the steps of flowing a vehicle through said pipeline while detecting ultrasonic energy within a predetermined frequency band that is arriving at said vehicle. Also, it comprises the steps of recording said energy using a slow record speed so long as said energy does not exceed a predetermined threshold amplitude, and increasing said record speed whenever said energy exceeds said threshold amplitude.

Again, briefly, the invention concerns a pipeline leak detector system. It comprises, in combination, a vehicle adapted for being flowed through a pipeline by the fluid flow therein, which vehicle includes articulated sections to permit passage around sharpest bends to be encountered. It also comprises a hydrophone carried by said vehicle for detecting sonic energy transmitted by said pipeline fluid and for generating electrical signals in accordance therewith. And it comprises first circuit means including a band pass for transmitting said signals within a predetermined sonic frequency range of 20–60 kilo-Hertz. It also comprises a rectifier connected to said first circuit means, a plurality of signal amplitude detectors connected to said rectifier, and a digital recorder having separate means for writing in response to each of said signal amplitude detectors as well as for each of three digits of a distance measurement record. It also comprises second circuit means for connecting the outputs of said amplitude detectors respectively to one of said writing means, and a print solonoid associated with said digital recorder. It also comprises an electronic clock providing separate channels of output timing pulses having slow and fast timing intervals therebetween, and a mode selector for determining which of said slow or fast timing intervals are provided by said clock. It also comprises third circuit means for connecting the output of the lowest amplitude of said signal amplitude detectors to said mode selectors for changing said timing pulses from slow to fast when said lowest signal amplitude is exceeded. It also comprises fourth circuit means for connecting said timing pulses to said print solonoid, and means for actuating said writing means when said print solonoid is energized, whereby said signal amplitude detector outputs and said three digits of distance measurement are recorded as each output timing pulse is received.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENTS

Figure 1:
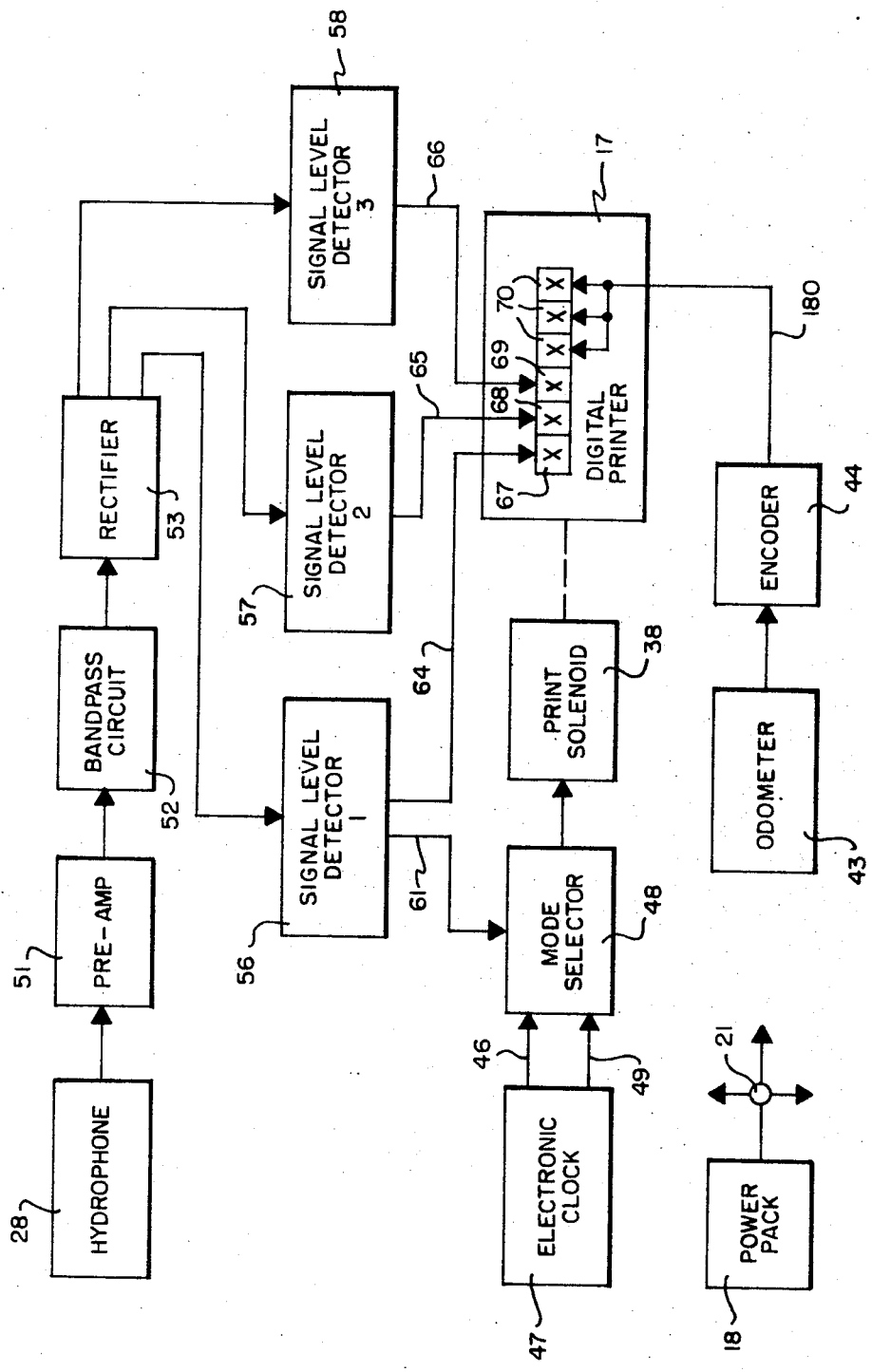
FIG. 1 is a block diagram illustrating the entire system of a leak detector according to the invention.
Figure 2:
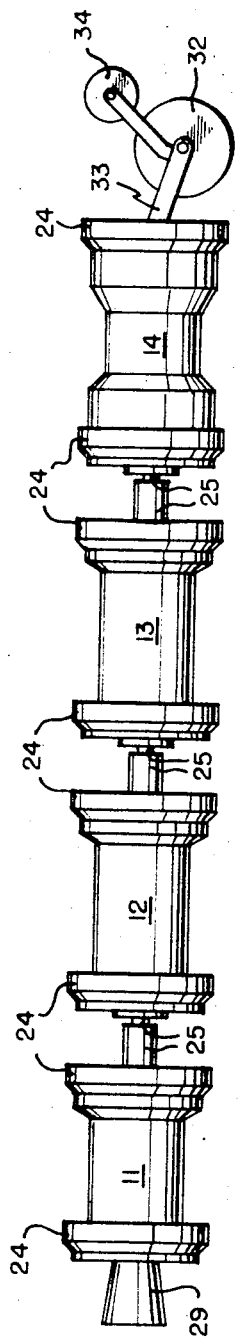
FIG. 2 is a schematic side elevation illustrating the general structure of a leak detector that may house the system according to FIG. 1.

Referring first to FIG. 2, it will be observed that a preferred structure of a vehicle for housing the elements of the illustrated system according to this invention is shown. It has a plurality of articulated sections 11, 12, 13 and 14. A block diagram of the elements housed in or attached to the vehicle, is shown in FIG. 1. The system includes a digital recorder 17 (FIG. 1) that is located physically in the rearmost section 14 of the vehicle (FIG. 2). It has the caption "DIGITAL PRINTER" in the FIG. 1 illustration.

Sections 12 and 13 of the vehicle carry the source of electrical power therein. These may be battery packs of any feasible type, and they are illustrated in FIG. 1 by a block numbered 18. FIG. 1 indicates schematically the fact that power from the batteries is supplied to the system, i.e., by employing the caption "POWER PACK", and by showing a symbol 21 which has three arrows pointing outward therefrom.

It will be understood that the articulated sections 11–14 of the vehicle are each a short cylindrical unit having flexible flanges 24 at the ends thereof. These flanges act to create a fluid seal with the walls of the pipeline, so that fluid pressure caused by flow of the pipeline fluid itself will cause a force (or flowing action) that will carry the vehicle through the pipeline along with the fluid flowing therein.

These relatively short sections are connected securely together by flexible joints 25 so that the vehicle may pass freely through the pipeline, even where the sharpest bends in the pipeline are encountered. Such flexible joints 25 are preferably constructed using a stiff sleeve surrounding a flexible cable so that the joint may withstand both compression and tension while permitting sufficient flexibility to have the vehicle pass around sharp curves, as indicated above. Details of the structure of these flexible joints 25 will be described in greater detail and claimed, per se, in a co-pending patent application, to be filed. For the purposes of this invention, the use of any feasible flexible coupling between individual sections 11–14 might be employed.

Section 11 of the vehicle is at the front as the vehicle is flowed through a pipeline, and it contains a hydrophone 28 (FIG. 1) inside of a frusto-conical shield 29 (FIG. 2). The shield 29 is open toward the front of the vehicle so that sonic energy signals in the pipeline fluid will have an unobstructed path to said hydrophone until the front of the vehicle passes the source of such energy. Thereafter, the frequencies of concern will be quite highly attenuated by the shield 29. This assists in determining the location of the source of sonic energy, by creating a sharp change in the amplitude as the vehicle passes.

The rearmost section 14 of the vehicle contains most of the elements shown in FIG. 1, including the digital printer, or recorder 17. There are, of course, electrical circuit connectors that include flexible cables (not shown) for making electrical circuit connections between all of the articulated sections 11–14.

Also attached to section 14, there is an odometer wheel 32 that is journaled at the end of a pivotally attached arm 33. This arm 33 is centrally connected to the rear of section 14 with a swivel joint (not shown). There is an idler wheel 34 that is hinged with spring action (not shown) to the arm 33 in order to maintain contact between the periphery of the odometer wheel 32 and the inner wall of the pipeline. Specific details of such an odometer wheel and accompanying structure are illustrated and claimed in the co-pending patent application identified above.

An important feature of this invention is the fact that the recorder 17 creates at a slow speed unless the hydrophone 28 detects sonic signals that exceed a predetermined amplitude. When such amplitude signals are detected, the recording speed is increased. However, the increase continues only so long as the detected signals are present, and it drops back to low speed once more thereafter. This permits use of a record that is not unduly lengthy so that a survey which covers 25 miles of pipeline may easily be accomplished, even in a pipeline having a relatively small diameter, e.g., 6 inches.

Figure 3:
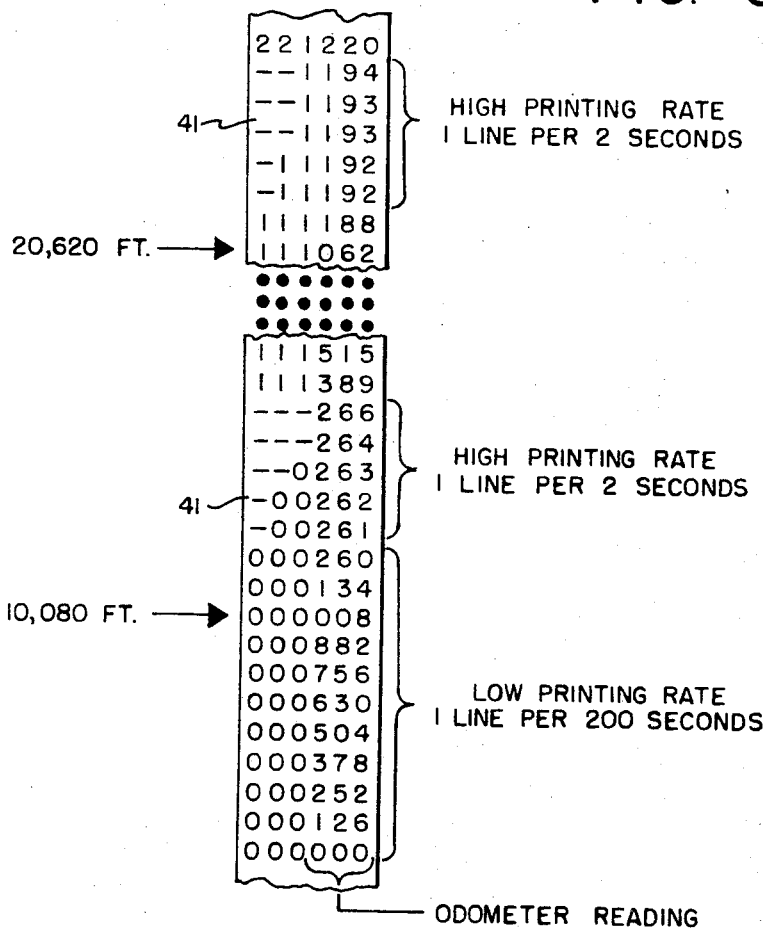
FIG. 3 illustrates a record strip such as would be produced by a leak detector like that illustrated in FIGS. 1 and 2.

The recorder 17 might take various forms. However, in the preferred modification of the invention being described, it is a digital printer (with slight adaptation) manufactured by Practical Automation, Inc. of Shelton, Connecticut. The manufacturer's designation is Model MMP-6 3PMA-3SMA. The instrument includes a print solonoid 38 (FIG. 1) that acts to make a writing (or recording) by printing out numbers on a paper strip 41 (FIG. 3). The print-out includes six digits, and the left-hand three columns are either numbers or horizontal dashes. The dashes indicate the presence of leak-generated sonic energy that exceeds one of three predetermined amplitude levels, while the numbers indicate the number of times each amplitude level is attained.

The right-hand three columns of the record strip 41 represent the readings of an odometer 43 (FIG. 1) that employs the wheel 32 (FIG. 2) and other physical elements that are conventional in the manner that they operate. The arrangement is such as to produce electrical pulses as the wheel 32 rotates and measures the distance of travel of the vehicle. Such pulses are sent to an encoder 44 which controls setting of the three right-hand column digits. In this manner, as the vehicle travels through the pipeline, the odometer 43 continuously determines the distance and provides digital outputs for three decimal places. This is done with the right-hand column of digits representing ten feet of travel so that the turnover to three zeros represent 10,000 feet, as is indicated by the captions on FIG. 3.

Continuing to refer to FIG. 1, it is pointed out that absent any sonic energy in a given frequency band and above a predetermined amplitude (picked up by the hydrophone 28), the recorder 17 is periodically actuated (low speed) to print out a reading from the odometer 43 and, at the same time, to indicate the fact concerning less than threshold amplitude of acoustic energy at that time. This is accomplished by having an electronic clock 47 that may include an accurate oscillator. It provides output pulses which are counted and connected to two separate outputs 46 and 49 that lead to a mode selector 48. The output of the mode selector will actuate the print solonoid 38. Thus, in the absence of leak-generated acoustic energy from hydrophone 28, the recorder 17 is operated at a low speed, i.e. with relatively long time intervals between each print-out operation.

As acoustic energy is detected by hydrophone 28, it is transmitted via a preamplifier 51 to a band-pass circuit 52 and then to a rectifier 53. The band-pass circuit 52 is conventional and is illustrated in greater detail hereafter. Of course, it may be designed for any given band of frequencies. However, it has been found that for the best leakage-signal to noise-signal ratio, a band pass that covers 20 to 60 kilo-Hertz signals is to be preferred.

Signals from the output of the rectifier 53 are connected in parallel to three signal level detectors 56, 57 and 58. These detectors act so as to provide output signals when the output of the rectifier 53 exceeds each of the three predetermined amplitudes, with the lowest amplitude being that passed by first detector 56. Then the next-highest amplitude is passed to provide its output signal when the output of rectifier 53 reaches a next-higher step as determined by the detector 57, while the highest amplitude is passed to provide an output signal as determined by detector 58.

The first, or lowest-level detector 56 has an extra output circuit 61 that goes to the mode selector 48. This controls the mode selector 48, as has been indicated above. Therefore, there is a shift by the mode selector from one clock pulse output to the other so that the intervals between output pulses to actuate the print solonoid 38 will be greatly reduced (recording speed increased), e.g. from 200-second intervals to 2-second intervals.

It will be noted that the foregoing action increases the effective speed of the recorder 17 from low-speed (200-second intervals) to high-speed (2-second intervals) recording, and this takes place whenever the leak-generated acoustic energies exceed the predetermined amplitude that is determined by the first signal level detector 56.

The additional signal level detectors 57 and 58, along with the first level detector 56, each have an output circuit 64 (detector 56), 65 (detector 57) and 66 (detector 58), respectively. These go to one of three print heads 67, 68 and 69, respectively, that are located on the recorder 17. The print heads are individually actuated, and whenever the print solonoid 38 is energized they will print out the left-hand three column digits on the record strip 41 (FIG. 3) that was described above.

It will be appreciated that the recorder 17 advances the record strip 41 by steps, with each advance carried out on the return stroke of the print solonoid. Consequently, the speed of recording is determined by the intervals between print-outs. Thus, slow record speed is maintained during no-leak signal conditions, and a minimum amount of record strip is required. This makes feasible the recording of long pipeline sections which are often encountered.

It is also to be noted that the individual print heads on the recorder 17 are separately actuated at different times from the print solonoid 38. For example, there are three print heads 70 that determine the numbers for the three digits of the odometer readings, as was indicated above. While the other three print heads 67, 68 and 69 are actuated whenever the three signal level detectors provide output signals, the print solonoid 38 acts on all six print heads simultaneously and makes a record of the reading for all of them at that moment.

Figure 4:
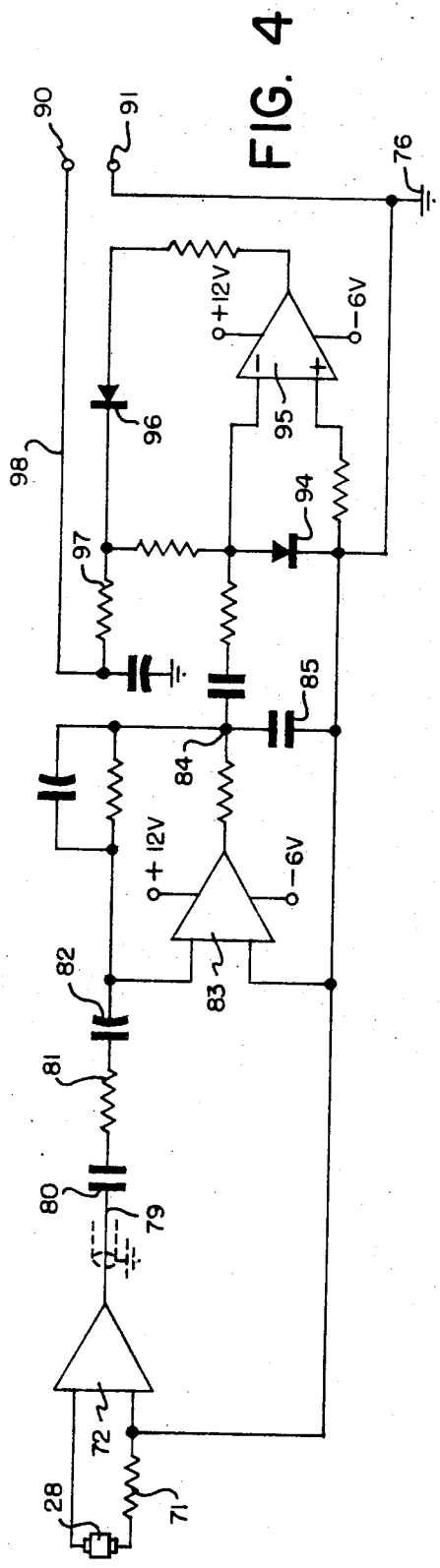
FIG. 4 is a circuit diagram illustrating more specifically those elements that make up the top line of blocks in the FIG. 1 block diagram.

More detailed showings of the circuits that relate to the elements of the system of FIG. 1 are illustrated in FIGS. 4–8. For example, FIG. 4 shows the circuits of the top four elements in FIG. 1, i.e. the hydrophone 28, the preamplifier 51, the band-pass circuit 52 and the rectifier 53.

Thus, referring to FIG. 4, there is shown the hydrophone 28 which is connected in an electrical circuit including resistor 71 that goes to the input of a preamplifier 72. The output of preamplifier 72 is fed over a circuit that includes, as one path thereof, a common ground circuit 75 which is grounded by a ground connection 76. The ungrounded side of the circuit from preamplifier 72 goes via a shielded circuit connection 79 to one side of a capacitor 80. The other side of capacitor 80 goes via a resistor 81 and a capacitor 82 to the ungrounded input connection of an amplifier 83 which has an output connection leading to the circuit point 84. The band-pass circuit is made up of the amplifier 83 in addition to the entire network of capacitors and resistors, as illustrated, which are located between the output of preamplifier 72 and the circuit connection point 84. Thus, the output of the band pass has a capacitor 85 connected across it.

The rectifier 53 (FIG. 1) is specifically illustrated in FIG. 4. It includes that part of the circuit which is connected to the output of the band-pass network. Thus, it goes from the circuit connection point 84 to a pair of output terminals 90 and 91. This network acts to rectify the signals passed by the band-pass network and also is a peak detector. Thus, the AC signals from hydrophone 28 are passed through the preamplifier 72 and then a band-pass circuit to exclude the AC signals except for a predetermined optimum acoustic frequency range. Such AC signals that pass are then rectified so as to provide a DC voltage or peak signal output at the terminals 90 and 91. This peak detector, or rectifier is made up of a network as shown, which includes a diode 94 across input terminals of an integrated circuit-type amplifier 95. Amplifier 95 has a feedback output via another diode 96 which is connected to an output network including a resistor 97 in series with a circuit connection 98 that leads to the output terminal 90.

Figure 5:
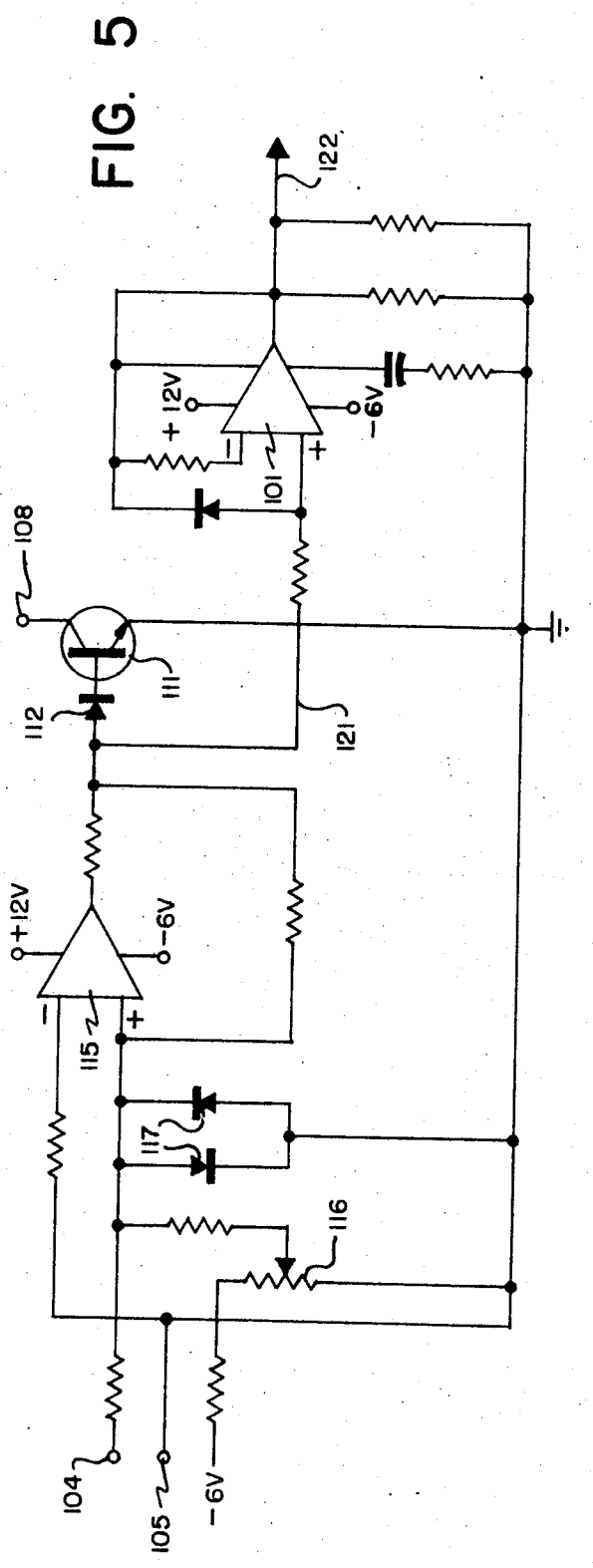
FIG. 5 is a circuit diagram illustrating a particular circuit for the first signal level detector of the FIG. 1 diagram, which includes an output to control the mode selector.

FIG. 5 shows a specific circuit that may be employed for the first signal level detector 56 (FIG. 1). It includes an isolation amplifier 101 that transmits an output of the detector to the mode selector 48 (FIG. 1).

The signal level detector itself (FIG. 5) has a pair of input terminals 104 and 105 that will be connected directly to the output terminals 90 and 91, respectively, of the rectifier (peak detector) circuit illustrated in FIG. 4. The input signals received at terminals 104 and 105 will be passed on to an output terminal 108 whenever they exceed a predetermined amplitude.

The circuit for detecting the first, or lowest amplitude leak-generated signal and for providing the foregoing output signal at terminal 108 includes a transistor 111 that has its emitter connected to ground and its collector connected to the output terminal 108. The base electrode is connected via a diode 112 to the output of an integrated circuit-type amplifier 115. The input of this amplifier is from the input terminals 104 and 105 via a shunt network that includes a potentiometer 116 plus a pair of oppositely connected diodes 117. Consequently, only signals that exceed the amplitude set by the potentiometer 116 will be passed on to the amplifier 115.

Whenever there are signals at the output of detector 56 (FIG. 1) and specifically at terminal 108, as just described, there are signals out from the amplifier 115. These are simultaneously applied to the print head circuit via the output terminal 108 and are also transmitted over a circuit connection 121 to the input of the isolation amplifier 101. The output of that isolation amplifier goes via a circuit connection 122 to the mode selector 48 (FIG. 1) that is shown in greater detail in FIG. 8. It will be understood that the isolation amplifier 101 (FIG. 5) and its accompanying network act as indicated by the terms, i.e. to isolate and prevent undesired interaction while delivering signals from the output of the first signal level detector 56 (FIG. 1) to determine the state of the mode selector 48 (FIG. 1).

Figure 8:
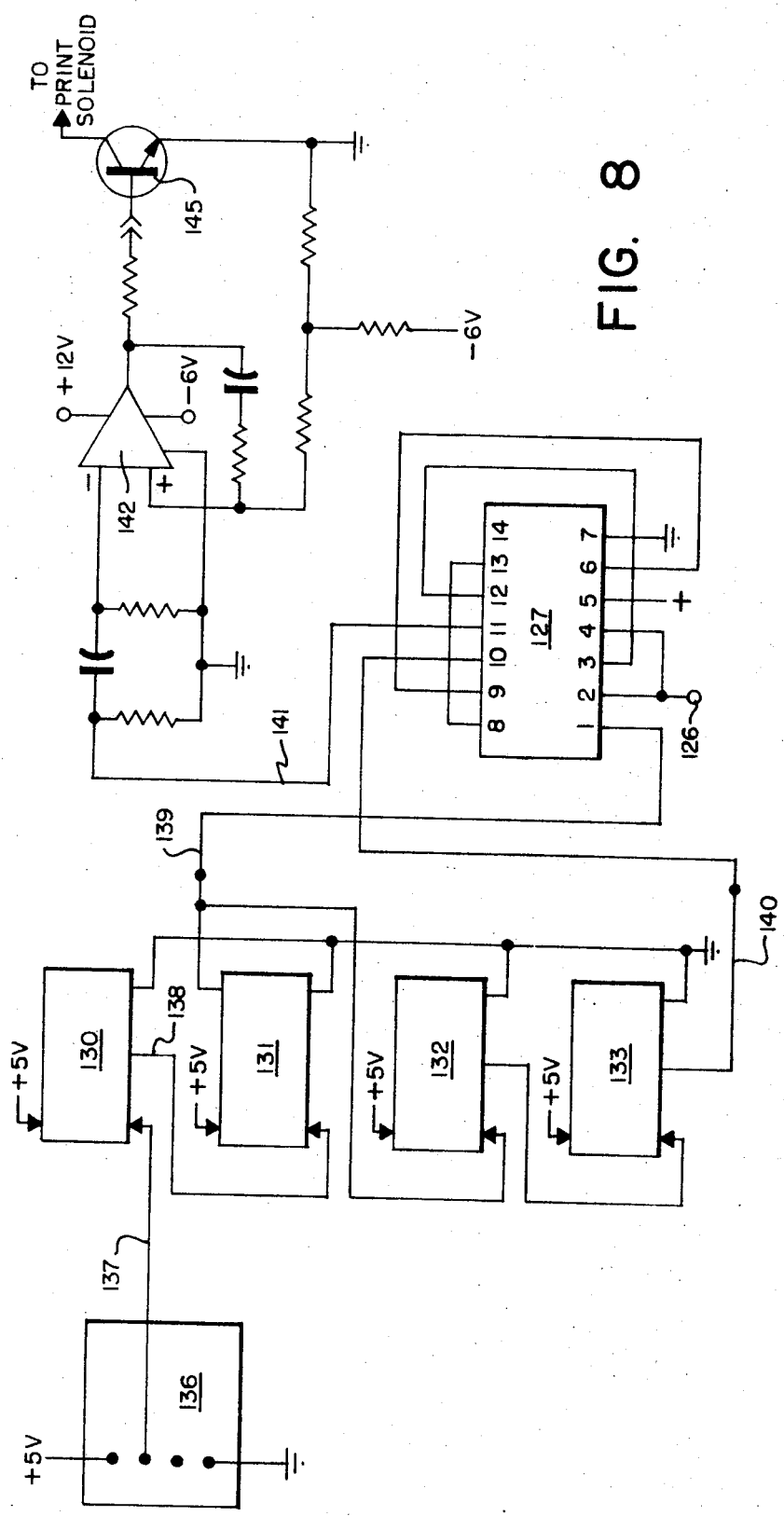
FIG. 8 is a circuit diagram, with integrated circuit elements shown in block form, illustrating particular circuits for the three elements in FIG. 1 that are on the same line as the digital printer, i.e. the electronic clock, the mode selector and the print solonoid.

FIG. 8 shows details of the electronic clock 47 (FIG. 1) and the mode selector 48 (FIG. 1), including the connection 61 (FIG. 1) that comes from the first signal level detector 56 (FIG. 1). Thus, in FIG. 8, there is a terminal 126 that will be connected to the output circuit 122 (FIG. 5) from isolation amplifier 101 (FIG. 5). The presence or absence of a signal at terminal 126 (FIG. 8) will control the state of the mode selector.

The mode selector includes an integrated circuit 127 and a series-connected group of additional integrated circuits 130, 131, 132 and 133. The arrangement is such to provide two separate pulse-rate outputs from an oscillator 136 which is the basic timing unit of the electronic clock 47 (FIG. 1).

The integrated circuit 127 may be a commercial unit, and it is connected so as to provide four dual input NAND gates. These are interconnected, as indicated by the circuits shown, between the various numbered terminals of the integrated circuit 127. The result is that the presence or absence of a signal at the terminal 126 determines which mode is selected.

The oscillator 136 produces a continuous series of timing pulses which are fed over a circuit connection 137 to the input of the first integrated circuit 130. The output from 130 goes to the input of the next integrated circuit 131 over a circuit connection 138, and the series continues from there to the integrated circuits 132 and 133 as indicated; with the output at the end of the series going over a circuit connection 140 to an input of one of the NAND gates of the integrated circuit 127.

There is another output connection 139 that goes out from the output of the second integrated circuit 131. This connection 139 goes to another one of the NAND gates of the integrated circuit 127.

The integrated circuits 130-133 are commercial units and they are connected to act as counting circuits so that the pulse rate of the clock oscillator is reduced in two stages to provide two different modes or pulse rates at the separate output connections 139 and 140. In the preferred system being described, the clock oscillator 136 runs at a frequency of 64 cycles per second and the counter circuits 130 and 131 are connected to each divide by sixteen so that the output connection 139 will carry the faster recording speed pulses at intervals of two seconds apart. And the other two counters 132 and 133 are connected as decade counters to produce the slow recording speed pulses over the other output connection 140 at intervals of 200 seconds apart.

As indicated above, the integrated circuit 127 is connected so that a predetermined one of the two modes of pulse frequency inputs will be transmitted on over a circuit connection 141 to the input of an amplifier 142. The output of the amplifier 142 goes to the base electrode of a transistor 145 which has its collector-emitter circuit connected to the print solenoid 38 (FIG. 1), as indicated by the caption "TO PRINT SOLONOID" in FIG. 8.

It will be understood from the foregoing that the print solonoid of the recorder 17 is energized once every 200 seconds as the vehicle, or pig, starts a run. Consequently, at the speed of travel through the pipeline that is illustrated by the record shown in FIG. 3, the vehicle will travel 1260 feet between print-outs. However, whenever leak frequency sonic energy is detected above the predetermined amplitude set by the first signal level detector 56 (FIG. 1), it will produce a signal over the output connection 61 that goes to the mode selector 48 (FIG. 1). In the more specific circuits, it is the signal transmitted over connection 122 (FIG. 5) that is connected to the terminal 126 (FIG. 8).

The signal thus produced by the leak-generated sonic energy will shift the mode selector to cause the print solonoid to be actuated every 2 seconds. And, as illustrated in FIG. 3, during this time the vehicle will have traveled less than 20 feet between print-outs.

The second and third signal level detectors 57 and 58 (FIG. 1) are substantially like the first signal level detector 56, except that they do not employ the additional output circuit 61. Rather, each of them feeds only the output circuit 65 or 66, respectively, and these outputs go to actuate the print heads 68 and 69, respectively, as has been indicated above.

Figure 6:
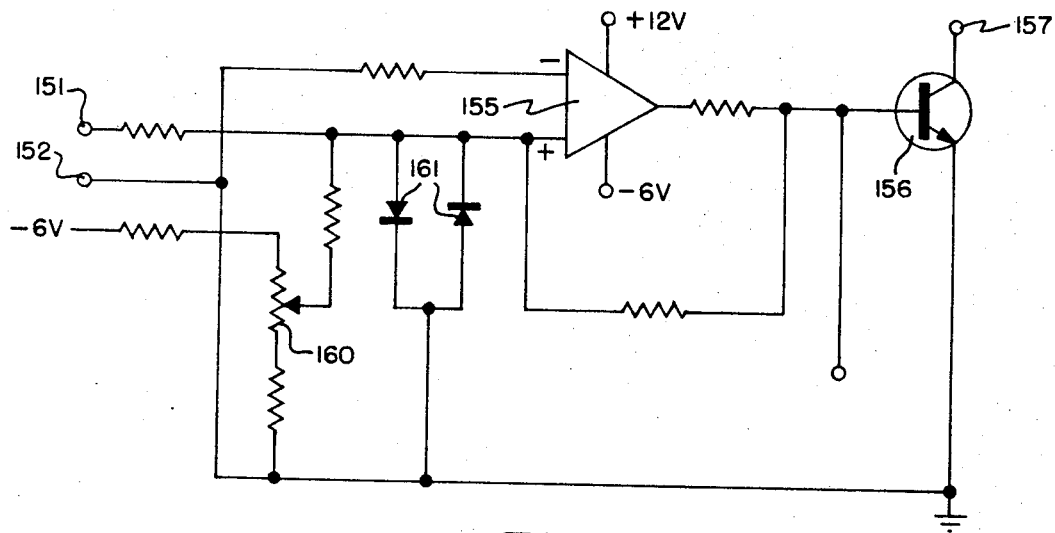
FIG. 6 is a circuit diagram showing a particular circuit that may be used for either of the other two signal level detectors 2 or 3 shown in FIG. 1.

Thus, each of the second and third level detectors has a circuit like that illustrated in FIG. 6. This circuit includes input terminals 151 and 152 that are connected in parallel with the input terminals 104 and 105 (FIG. 5) of the first signal level detector. As with the first detector, there is an integrated circuit-type amplifier 155. And the output is connected directly to the base electrode of a transistor 156. The transistor 156 is connected in an output circuit that includes the collector-emitter thereof.

The output circuit includes an output terminal 157, and this will be in either the circuit 65 (FIG. 1) or 66 (FIG. 1), which go to the print heads 68 (FIG. 1) and 69 (FIG. 1), respectively, for actuating same.

In addition, with reference to FIG. 6, there is a potentiometer 160 at the input of the amplifier 155 which may be adjusted to set the amplitude of an input signal that must be exceeded in order to cause an output signal from the amplifier 155. It will be noted that this is similar to the action described above in connection with FIG. 5, and there is a pair of oppositely connected diodes 161 that have the potentiometer-controlled voltage connected across them so that they create a shunt path for all signals at and below that signal level.

It will be appreciated that the potentiometer 160 will be set at a higher voltage level for the third signal level detector 58 (FIG. 1) than for the second signal level detector 57. In this manner, each of the three print heads 67, 68 and 69 will be actuated by the respective level detectors whenever the signal level of the acoustic signals exceeds one of the predetermined amplitudes.

The print heads are arranged to print out a horizontal dash whenever the amplitude exceeds the predetermined level. Thereafter, they are stepped around to print out a digital number in sequence when the level has fallen below the predetermined amplitude. In this manner, the record, as printed out, will provide a digital indication of three discrete amplitude levels for the acoustic energy being detected. In addition, it will indicate the sequential number of times when such acoustic energy detection has taken place.

Figure 7:
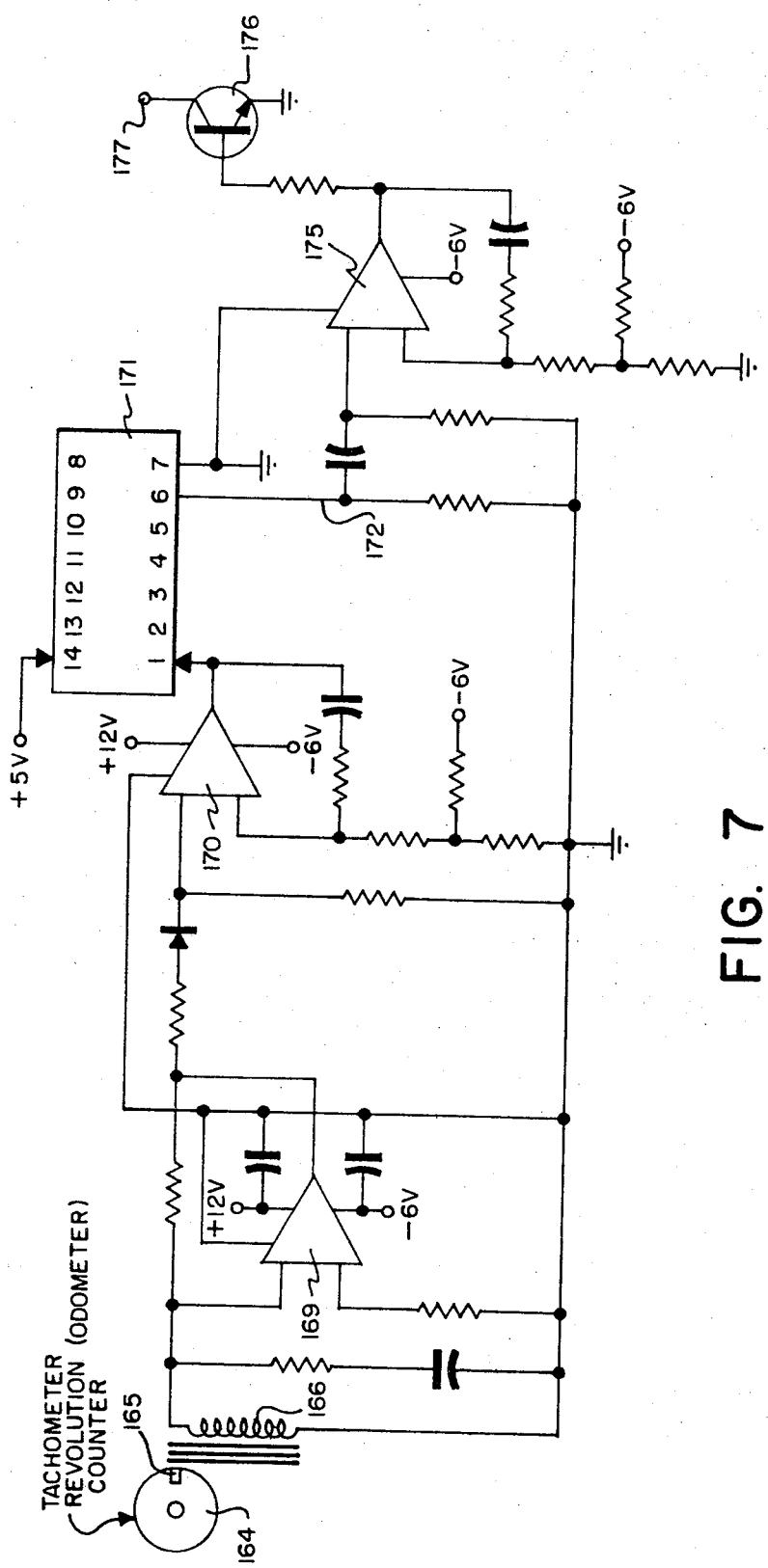
FIG. 7 is a circuit diagram illustrating particular circuits that may be employed for the bottom two blocks or elements of FIG. 1, i.e. the odometer and encoder.

Referring to FIG. 7, there is a circuit that may be employed as the odometer 43 and encoder 44 elements of the FIG. 1 system. There is a tachometer revolution counter 164 that has a magnetic insert 165 which causes a coil 166 to be energized once each revolution of the tachometer 164. This produces a pulse, or count for each revolution of the odometer wheel 32 (FIG. 2).

The pulses generated in the coil 166 are amplified in an amplifier 169 which has its output connected to another amplifier 170 the output of which is connected to an integrated circuit 171. The integrated circuit 171 is a commercial item and may be one manufactured by Motorola that has the number designation 838 P. It is connected to act as a scale of ten counter so that every 10th pulse at the input, i.e. the output from amplifier 170, will produce an output pulse over a circuit connection 172 that goes to the input of an amplifier 175. These output pulses will appear once every ten revolutions of the counter 164. Consequently, in order to provide one such output pulse for every ten feet of measured distance traveled by the vehicle, it is merely necessary to have the effective circumference of the odometer wheel exactly one foot so that after ten revolutions it will have measured 10 feet.

The output from amplifier 175 goes to the base electrode of a transistor 176 to produce output signals at a terminal 177. It will be understood that these output pulses will be fed from the terminal 177 to the recorder 17 (FIG. 1), as indicated by a schematic circuit connection 180, shown in FIG. 1. As already indicated previously, each pulse represents 10 feet of distance traveled and it will actuate the right-hand one of the print heads 70. The other two print heads will be actuated in a normal decimal manner, successively as the next-adjacent right-hand one goes from its digit number nine to zero. Consequently, as indicated previously, the right-hand three columns of digits on the record strip 41 (FIG. 3) will continuously indicate the distance traveled by the vehicle (in minimum-sized steps of 10 feet).

Leak Detection Method

This invention provides for a method of detecting leaks in pipeline operations. It has a special benefit of the ability to accurately locate a leak which might be located anywhere along very substantial lengths of buried pipeline which may cover distances on the order of 25 miles or more. The method involves steps which relate to the use of a pipeline vehicle that is flowed through the line as the pipeline fluid is being pumped therethrough. The steps, which are not necessarily the only ones involved, and which might not necessarily be carried out in the order recited, comprise the following:

First, flowing a vehicle through the pipeline. In the instant description, the vehicle itself preferably takes the form of one like that illustrated in FIG. 2.

A second step is that of detecting ultrasonic energy arriving at the vehicle that is within a predetermined frequency band.

A third step is that of recording the ultrasonic energy using a slow record speed so long as the energy does not exceed a predetermined threshold amplitude. It will be appreciated that this step may include a slow record speed that goes down to and includes zero speed if desired. However, it is usually beneficial to provide for some recording periodically, even though no ultrasonic energy in the predetermined frequency band is being detected.

Finally, a fourth step is that of increasing the record speed whenever the said energy exceeds the predetermined threshold amplitude. This step lies at the heart of the invention, and it magnifies the recording of leak energies without necessitating an unmanageable amount of record medium.

In addition to the steps set forth above, the method of this invention may include a step of measuring the distance traveled by the vehicle through the pipeline. This step is preferably carried out using a specially constructed odometer so that highly accurate distance measurement may be made.

System Continued

With reference to the recording apparatus once more and as mentioned previously, one example of the form which the recording may take is that illustrated in FIG. 3. The manner of operating the recording instrument is such as to periodically cause print-out of digital numbers with the time interval between such print-outs being two hundred seconds while the system is operating at low speed. Then, whenever the acoustic energy signals exceed the predetermined minimum, as explained above, the intervals between print-out operations will be speeded up so as to be every 2 seconds. This is clearly illustrated in FIG. 3, with the captions indicating those portions of the record where the speed has changed. It will be noted that the distance recording is carried out by the right-hand three columns of the print-out. Consequently, with the arrangement described, the print heads 70 (FIG. 1) that indicate distance will be actuated so as to advance the right-hand column digits once every ten feet. Similarly, the middle-column digits will be actuated by carry-over from the right-column, and advance once every 100 feet. And, finally, by carry-over from the middle column, the left-hand of the three columns will advance once every thousand feet. Consequently, after each 10,000 feet, the digital number print-out will pass beyond three nines and, of course, the next series of numbers will be the next ten-thousand feet in succession.

The left-hand three columns of print-out numbers (and horizontal dashes) are actuated by the output from the three signal level detectors. Consequently, there is a digital record made which indicates amplitude of the acoustic energy being detected by recording three discrete levels thereof. Furthermore, each time a leak detection falls below the predetermined minimum amplitude, the print-out numbers will be advanced to the next digit. In this manner, the total number of leaks detected will be recorded and shown by the left-hand one of the three amplitude columns of the record, while the number that exceeds the second and third amplitude level, respectively, will similarly be recorded by the number digit printed in each of the adjacent two columns, beginning from the left.

While the foregoing embodiments of the invention have been described above in considerable detail in accordance with the applicable statues, this is not to be taken as in any way limiting the invention, but merely as being descriptive thereof.

What we claim is:

1. In pipeline leak detection a method of accurately determining the location of a leak, which comprises:
   flowing a vehicle through said pipeline, while
   detecting ultrasonic energy within a predetermined frequency band arriving at said vehicle,
   recording said energy at a slow record speed so long as said energy does not exceed a predetermined threshold amplitude, and
   increasing said record speed whenever said energy exceeds said threshold amplitude.

2. A method according to claim 1, further comprising the steps of measuring the distance traveled by said vehicle through said pipeline, and recording said distance whenever said ultrasonic energy is recorded.

3. A method according to claim 2, wherein said recording is digital.

4. A pipeline leak-detection system, comprising in combination a vehicle adapted for being carried through a pipeline, a sonic detector on said vehicle for picking up leak-generated sonic-energy, a recorder carried by said vehicle for recording said sonic energy, and means for changing the speed of said recording whenever said sonic energy exceeds a predetermined amplitude.

5. A pipeline leak-detection system according to claim 4, wherein said sonic detector comprises a hydrophone for generating electrical signals in accordance with said sonic energy, and means for amplifying and detecting said predetermined amplitude, and wherein said speed-changing means comprises electrical means actuated by said detecting means.

6. A pipeline leak-detection system according to claim 4, further comprising an odometer carried by said vehicle, and means for recording said odometer readings simultaneously with said sonic energy recording.

7. A pipeline leak-detection system according to claim 5, further comprising an odometer carried by said vehicle, and means for recording said odometer readings simultaneously with said sonic energy recording.

8. A pipeline leak-detection system according to claim 5, wherein said recorder is digital, and wherein said speed-changing electrical means comprises a clock, means for timing the intervals between said digital recordings, and circuit means for selecting relatively short intervals of time whenever said predetermined amplitude has been exceeded.

9. A pipeline leak-detection system according to claim 8, wherein said digital recorder includes a print solonoid, said sonic detector includes a plurality of detecting means for detecting additional steps of sonic energy amplitude, and said digital recordings include indication of said additional amplitude steps.

10. A pipeline leak-detection system according to claim 9, further comprising an odometer carried by said vehicle, and means for recording said odometer readings simultaneously with said sonic energy recordings.

11. A pipeline leak-detection system, comprising in combination a vehicle adapted for being flowed through a pipeline by the fluid flowing therein, including articulated sections to permit passage around the sharpest bands to be encountered, a hydrophone carried by said vehicle for detecting sonic energy transmitted by said pipeline fluid and generating electrical signals in accordance therewith, first circuit means including a band pass for transmitting said signals with a predetermined sonic frequency range of 20–60 kilo-Hertz, a rectifier connected to said first circuit means, a plurality of signal amplitude detectors connected to said rectifier, a digital recorder having separate means for writing in response to each of said signal amplitude detectors and for writing three digits of a distance measurement record, second circuit means for connecting the outputs of said amplitude detectors respectively to one of said writing means, a print solonoid associated with said digital recorder an electronic clock providing separate channels of output timing pulses having slow and fast timing intervals therebetween, a mode selector for determining which of said slow or fast timing intervals are provided by said clock, third circuit means for connecting the output of the lowest amplitude one of said signal amplitude detectors to said mode selector for changing said timing pulses from slow to fast when said lowest signal amplitude is exceeded, fourth circuit means for connecting said timing pulses to said print solonoid, and means for actuating said writing means when said print solonoid is energized whereby said signal amplitude detector outputs and said three digits of distance measurement are recorded as each output timing pulse is received.

* * * * *